United States Patent
Otani

(10) Patent No.: US 11,571,909 B2
(45) Date of Patent: Feb. 7, 2023

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Ryosuke Otani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 17/080,993

(22) Filed: Oct. 27, 2020

(65) Prior Publication Data
US 2021/0155009 A1    May 27, 2021

(30) Foreign Application Priority Data

Nov. 27, 2019   (JP) ............................. JP2019-214295

(51) Int. Cl.
  *B41J 2/21*   (2006.01)
  *G06F 3/12*   (2006.01)

(52) U.S. Cl.
  CPC ............ *B41J 2/2103* (2013.01); *G06F 3/121* (2013.01)

(58) Field of Classification Search
  CPC ...... B41J 2/2103; B41J 2/2139; B41J 2/2142; B41J 2/2146; G06F 3/121; H04N 1/405; H04N 1/4015
  USPC .......................................................... 347/15
  See application file for complete search history.

(56) References Cited

U.S. PATENT DOCUMENTS

| | | | |
|---|---|---|---|
| 9,690,228 B2 | 6/2017 | Otani | |
| 10,073,370 B2 | 9/2018 | Takikawa et al. | |
| 10,194,053 B2 | 1/2019 | Otani et al. | |
| 10,545,446 B2 | 1/2020 | Takikawa et al. | |
| 2007/0019012 A1* | 1/2007 | Lee ........................ B41J 2/2139 | |
| | | | 347/8 |
| 2012/0062643 A1 | 3/2012 | Ito | |

(Continued)

FOREIGN PATENT DOCUMENTS

| | | |
|---|---|---|
| JP | 2012071474 A | 4/2012 |
| WO | 2015029788 A1 | 3/2015 |

OTHER PUBLICATIONS

European Search Report dated Apr. 12, 2021 by the European Patent Office in corresponding EP Patent Application No. 20204868.2.

*Primary Examiner* — Kristal Feggins
*Assistant Examiner* — Alexander D Shenderov
(74) *Attorney, Agent, or Firm* — Carter, DeLuca & Farrell LLP

(57) ABSTRACT

In a case where a line drawing, such as a thin line, is included within input image data, the output of a non-ejectable nozzle is compensated for while suppressing deterioration of reproducibility thereof. Based on positional information for specifying an abnormal nozzle in which an ejection failure has occurred among a plurality of nozzles arrayed in a nozzle column, a pixel value of a pixel on a pixel line corresponding to the abnormal nozzle and a pixel value of a pixel on a pixel line corresponding to another nozzle that is located in close proximity to the abnormal nozzle and in which no ejection failure has occurred are exchanged for the input image data. Then, halftone image data is generated by performing halftone processing for the input image data for which pixel value exchange has been performed.

13 Claims, 16 Drawing Sheets

(56) References Cited

U.S. PATENT DOCUMENTS

| | | | |
|---|---|---|---|
| 2014/0313255 A1* | 10/2014 | Ukishima | B41J 2/2142 347/14 |
| 2015/0286908 A1* | 10/2015 | Shibata | H04N 1/405 358/3.06 |
| 2019/0134990 A1 | 5/2019 | Siman-Tov et al. | |
| 2020/0156386 A1 | 5/2020 | Otani et al. | |
| 2020/0247137 A1 | 8/2020 | Otani et al. | |
| 2020/0349405 A1 | 11/2020 | Otani et al. | |

* cited by examiner

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| L1 | 0 | 0 | 0 | 0 | 0 | 0 | 0 | 1 | 0 | 0 | 0  | 0  | 0  | 0  | 0  | 0  |
| L2 | 0 | 0 | 0 | 0 | 0 | 0 | 0 | 1 | 0 | 0 | 0  | 0  | 0  | 0  | 0  | 0  |
| L3 | 0 | 0 | 0 | 0 | 0 | 0 | 0 | 0 | 0 | 0 | 0  | 0  | 0  | 0  | 0  | 0  |
| L4 | 0 | 0 | 0 | 0 | 0 | 0 | 0 | 1 | 0 | 0 | 0  | 0  | 0  | 0  | 0  | 0  |
| L5 | 0 | 0 | 0 | 0 | 0 | 0 | 0 | 1 | 0 | 0 | 0  | 0  | 0  | 0  | 0  | 0  |
| L6 | 0 | 0 | 0 | 0 | 0 | 0 | 0 | 0 | 0 | 0 | 0  | 0  | 0  | 0  | 0  | 0  |
| L7 | 0 | 0 | 0 | 0 | 0 | 0 | 0 | 0 | 0 | 0 | 0  | 0  | 0  | 0  | 0  | 0  |
| L8 | 0 | 0 | 0 | 0 | 0 | 0 | 0 | 1 | 0 | 0 | 0  | 0  | 0  | 0  | 0  | 0  |

FIG.6B

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| L1 | 0 | 0 | 0 | 0 | 0 | 0 | 1 | 0 | 0 | 0 | 0  | 0  | 0  | 0  | 0  | 0  |
| L2 | 0 | 0 | 0 | 0 | 0 | 0 | 0 | 0 | 0 | 0 | 0  | 0  | 0  | 0  | 0  | 0  |
| L3 | 0 | 0 | 0 | 0 | 0 | 0 | 1 | 0 | 0 | 0 | 0  | 0  | 0  | 0  | 0  | 0  |
| L4 | 0 | 0 | 0 | 0 | 0 | 0 | 0 | 0 | 0 | 0 | 0  | 0  | 0  | 0  | 0  | 0  |
| L5 | 0 | 0 | 0 | 0 | 0 | 0 | 1 | 0 | 0 | 0 | 0  | 0  | 0  | 0  | 0  | 0  |
| L6 | 0 | 0 | 0 | 0 | 0 | 0 | 0 | 0 | 0 | 0 | 0  | 0  | 0  | 0  | 0  | 0  |
| L7 | 0 | 0 | 0 | 0 | 0 | 0 | 1 | 0 | 0 | 0 | 0  | 0  | 0  | 0  | 0  | 0  |
| L8 | 0 | 0 | 0 | 0 | 0 | 0 | 1 | 0 | 0 | 0 | 0  | 0  | 0  | 0  | 0  | 0  |

FIG.6C

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| L1 | 0 | 0 | 0 | 0 | 0 | 0 | 1 | 0 | 0 | 0 | 0  | 0  | 0  | 0  | 0  | 0  |
| L2 | 0 | 0 | 0 | 0 | 0 | 0 | 0 | 0 | 0 | 0 | 0  | 0  | 0  | 0  | 0  | 0  |
| L3 | 0 | 0 | 0 | 0 | 0 | 0 | 0 | 0 | 1 | 0 | 0  | 0  | 0  | 0  | 0  | 0  |
| L4 | 0 | 0 | 0 | 0 | 0 | 0 | 0 | 0 | 0 | 0 | 0  | 0  | 0  | 0  | 0  | 0  |
| L5 | 0 | 0 | 0 | 0 | 0 | 0 | 0 | 0 | 0 | 0 | 0  | 0  | 0  | 0  | 0  | 0  |
| L6 | 0 | 0 | 0 | 0 | 0 | 0 | 0 | 0 | 1 | 0 | 0  | 0  | 0  | 0  | 0  | 0  |
| L7 | 0 | 0 | 0 | 0 | 0 | 0 | 1 | 0 | 0 | 0 | 0  | 0  | 0  | 0  | 0  | 0  |
| L8 | 0 | 0 | 0 | 0 | 0 | 0 | 1 | 0 | 0 | 0 | 0  | 0  | 0  | 0  | 0  | 0  |

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| L1 | 45 | 116 | 84 | 229 | 41 | 105 | 59 | 27 | 208 | 240 | 7 | 148 | 224 | 31 | 252 | 202 |
| L2 | 142 | 206 | 18 | 189 | 151 | 255 | 199 | 90 | 145 | 80 | 53 | 204 | 107 | 179 | 99 | 6 |
| L3 | 65 | 168 | 102 | 137 | 70 | 10 | 117 | 181 | 22 | 159 | 231 | 123 | 15 | 71 | 165 | 214 |
| L4 | 235 | 30 | 242 | 44 | 212 | 146 | 221 | 49 | 247 | 97 | 38 | 160 | 195 | 237 | 48 | 120 |
| L5 | 87 | 184 | 127 | 94 | 172 | 36 | 75 | 109 | 170 | 132 | 216 | 64 | 86 | 140 | 23 | 152 |
| L6 | 14 | 58 | 201 | 1 | 250 | 114 | 191 | 227 | 33 | 57 | 200 | 4 | 251 | 113 | 190 | 226 |
| L7 | 171 | 133 | 217 | 63 | 85 | 141 | 24 | 153 | 88 | 185 | 127 | 93 | 173 | 35 | 76 | 110 |
| L8 | 246 | 98 | 37 | 161 | 194 | 236 | 47 | 119 | 234 | 29 | 243 | 43 | 213 | 147 | 220 | 50 |
| L9 | 21 | 158 | 230 | 124 | 16 | 72 | 164 | 215 | 66 | 169 | 101 | 136 | 69 | 9 | 118 | 180 |
| L10 | 144 | 79 | 54 | 205 | 108 | 178 | 100 | 5 | 143 | 207 | 17 | 188 | 150 | 254 | 198 | 89 |
| L11 | 209 | 241 | 8 | 149 | 225 | 32 | 253 | 203 | 46 | 115 | 83 | 228 | 42 | 106 | 60 | 28 |
| L12 | 122 | 91 | 187 | 73 | 128 | 61 | 135 | 77 | 176 | 239 | 155 | 25 | 125 | 166 | 233 | 174 |
| L13 | 56 | 40 | 162 | 248 | 20 | 197 | 157 | 34 | 112 | 12 | 67 | 210 | 183 | 82 | 2 | 139 |
| L14 | 193 | 219 | 130 | 103 | 52 | 222 | 95 | 244 | 192 | 218 | 131 | 104 | 51 | 223 | 96 | 245 |
| L15 | 111 | 11 | 68 | 211 | 182 | 81 | 3 | 138 | 55 | 39 | 163 | 249 | 19 | 196 | 156 | 33 |
| L16 | 177 | 238 | 154 | 26 | 126 | 167 | 232 | 175 | 121 | 92 | 186 | 74 | 129 | 62 | 134 | 78 |

FIG.11B

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| L1 | 45 | 116 | 84 | 229 | 41 | 105 | 39.3 | 255 | 139 | 240 | 7 | 148 | 224 | 31 | 252 | 202 |
| L2 | 142 | 206 | 18 | 189 | 151 | 255 | 133 | 255 | 96.7 | 80 | 53 | 204 | 107 | 179 | 99 | 6 |
| L3 | 65 | 168 | 102 | 137 | 70 | 10 | 78 | 255 | 14.7 | 159 | 231 | 123 | 15 | 71 | 165 | 214 |
| L4 | 235 | 30 | 242 | 44 | 212 | 146 | 147 | 255 | 165 | 97 | 38 | 160 | 195 | 237 | 48 | 120 |
| L5 | 87 | 184 | 127 | 94 | 172 | 36 | 50 | 255 | 113 | 132 | 216 | 64 | 86 | 140 | 23 | 152 |
| L6 | 14 | 58 | 201 | 1 | 250 | 114 | 127 | 255 | 8.67 | 57 | 200 | 4 | 251 | 113 | 190 | 226 |
| L7 | 171 | 133 | 217 | 63 | 85 | 141 | 16 | 255 | 58.7 | 185 | 127 | 93 | 173 | 35 | 76 | 110 |
| L8 | 246 | 98 | 37 | 161 | 194 | 236 | 31.3 | 255 | 156 | 29 | 243 | 43 | 213 | 147 | 220 | 50 |
| L9 | 21 | 158 | 230 | 124 | 16 | 72 | 109 | 255 | 44 | 169 | 101 | 136 | 69 | 9 | 118 | 180 |
| L10 | 144 | 79 | 54 | 205 | 108 | 178 | 66.7 | 255 | 95.3 | 207 | 17 | 188 | 150 | 254 | 198 | 89 |
| L11 | 209 | 241 | 8 | 149 | 225 | 32 | 169 | 255 | 30.7 | 115 | 83 | 228 | 42 | 106 | 60 | 28 |
| L12 | 122 | 91 | 187 | 73 | 128 | 61 | 90 | 255 | 117 | 239 | 155 | 25 | 125 | 166 | 233 | 174 |
| L13 | 56 | 40 | 162 | 248 | 20 | 197 | 105 | 255 | 74.7 | 12 | 67 | 210 | 183 | 82 | 2 | 139 |
| L14 | 193 | 219 | 130 | 103 | 52 | 222 | 63.3 | 255 | 128 | 218 | 131 | 104 | 51 | 223 | 96 | 245 |
| L15 | 111 | 11 | 68 | 211 | 182 | 81 | 2 | 255 | 36.7 | 39 | 163 | 249 | 19 | 196 | 156 | 33 |
| L16 | 177 | 238 | 154 | 26 | 126 | 167 | 155 | 255 | 80.7 | 92 | 186 | 74 | 129 | 62 | 134 | 78 |

FIG.11C

IMAGE PROCESSING APPARATUS, IMAGE PROCESSING METHOD AND STORAGE MEDIUM

BACKGROUND OF THE INVENTION

Field of the Invention

The present disclosure relates to a technique to complement a non-ejectable nozzle.

Description of the Related Art

Conventionally, an ink jet printing apparatus is used that forms a desired image on a printing medium by ejecting ink droplets from each individual nozzle while relatively moving a print head having a nozzle column in which a plurality of ink ejection ports (nozzles) is arrayed and the printing medium.

In the ink jet printing apparatus, there is a case where a nozzle that becomes unable to eject ink (hereinafter, called "non-ejectable nozzle") during image formation occurs suddenly. Further, there is a case where a nozzle in which an abnormality has occurred, such as that the ink landing position error has become large to exceed a permissible value, is made forcibly unusable and handled as a non-ejectable nozzle.

In the case such as described above, it is also performed to suppress trouble on an image, such as streak and unevenness, resulting from a non-ejectable nozzle by so-called non-ejection complementation processing to eject ink droplets to be ejected by the non-ejectable nozzle by another nozzle. For example, Japanese Patent Laid-Open No. 2012-071474 has disclosed a method of disabling ejection of a nozzle in which an ejection failure has occurred and generating image data modified so as to compensate for the output of a non-ejectable nozzle by another nozzle other than the non-ejectable nozzle.

In the method of Japanese Patent Laid-Open No. 2012-071474 described above, the pixel values of the pixels adjacent to the left and the right of each pixel on the pixel line of the non-ejectable nozzle are corrected. Because of this, there is a case where reproducibility of a line drawing, such as a thin line, within input image data deteriorates.

An object of the present disclosure is to compensate for the output of a non-ejectable nozzle while suppressing deterioration of reproducibility in a case where a line drawing, such as a thin line, is included within input image data.

SUMMARY OF THE INVENTION

The image processing apparatus according to the present disclosure is an image processing apparatus that generates halftone image data based on multi-valued input image data, which is used by an image forming apparatus that forms an image on a printing medium by a print head including a nozzle column in which a plurality of nozzles is arrayed ejecting ink from the nozzles while relatively moving the printing medium in a direction perpendicular to the nozzle column, and includes: an exchange unit configured to, based on positional information for specifying an abnormal nozzle in which an ejection failure has occurred among the plurality of nozzles, exchange a pixel value of a pixel on a pixel line corresponding to the abnormal nozzle and a pixel value of a pixel on a pixel line corresponding to another nozzle that is located in close proximity to the abnormal nozzle and in which no ejection failure has occurred for the input image data; and a halftone processing unit configured to generate the halftone image data by performing halftone processing for the input image data for which pixel value exchange has been performed.

Further features of the present invention will become apparent from the following description of exemplary embodiments with reference to the attached drawings.

BRIEF DESCRIPTION OF THE DRAWINGS

FIG. 5A is a diagram showing an example of input image data, FIG. 5B is a diagram showing an example of image data after pixel value exchange is performed, and FIG. 5C is a diagram showing an example of image data after conventional pixel value correction is performed;

FIG. 6A to FIG. 6C are diagrams showing results obtained by performing halftone processing for each piece of image data in FIG. 5A to FIG. 5C, respectively;

FIG. 9A is a diagram showing an example of input image data, FIG. 9B is a diagram showing image data after pixel value exchange processing is performed for the input image data in FIG. 9A, FIG. 9C is a diagram showing image data after non-ejection complementation processing is performed for the image data after the pixel value exchange in FIG. 9B, and FIG. 9D is a diagram showing halftone image data obtained by performing halftone processing for the image data after the non-ejection complementation processing in FIG. 9C;

FIG. 11A is a diagram showing an example of a threshold value matrix, FIG. 11B is a diagram showing the threshold value matrix after non-ejection complementation processing is performed, and FIG. 11C is a diagram showing halftone image data obtained by dither processing using the threshold value matrix after the non-ejection complementation processing;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Hardware Configuration of Image Forming System)

Figure 1:
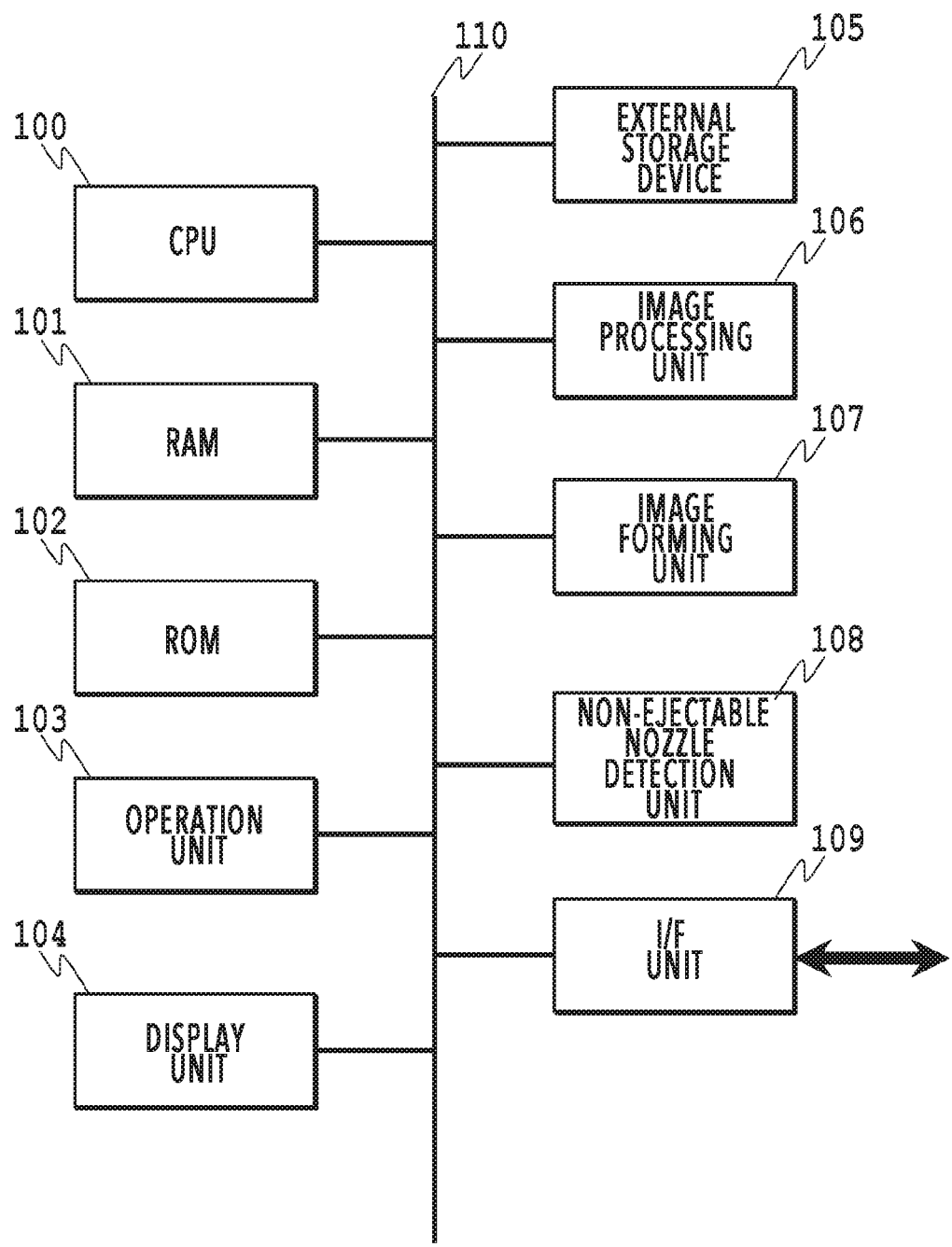
FIG. 1 is a diagram showing a hardware configuration of an image forming system.

FIG. 1 is a diagram showing a hardware configuration of an image forming system including an image processing apparatus according to a first embodiment. In the present embodiment, as the image processing apparatus, an image processing controller is explained as an example thereof, which is incorporated within the image forming system forming an image on a printing medium by using a printing material.

The image forming system comprises a CPU 100, a RAM 101, a ROM 102, an operation unit 103, a display unit 104, an external storage device 105, an image processing unit 106, an image forming unit 107, a non-ejectable nozzle detection unit 108, an I/F (interface) unit 109, and a bus 110.

The CPU (Central Processing Unit) 100 controls the operation of the entire image forming system by using input data and computer programs stored in the RAM and the ROM, to be described later. Here, a case where the CPU 100 controls the entire image forming system is explained as an example, but it may also be possible to control the entire image forming system by a plurality of pieces of hardware sharing processing.

The RAM (Random Access Memory) 101 temporarily stores computer programs and data read from the external storage device 105 and data received from the outside via the I/F unit 109. Further, the RAM 101 is used as a storage area used in a case were the CPU 100 performs various kinds of processing and as a storage area used in a case where the image processing unit 106 performs image processing. That is, it is possible for the RAM 101 to appropriately provide various storage areas. The ROM (Read Only Memory) 102 stores setting parameters that are set in each unit in the image forming system, a boot program and the like.

The operation unit 103 is an input device, such as a keyboard and a mouse, and receives an operation (instructions) by an operator. That is, it is possible for an operator to input various instructions to the CPU 100 via the operation unit 103. The display unit 104 is a display device, such as a CRT (Cathode Ray Tube) and an LCD (Liquid Crystal Display), and is capable of displaying processing results by the CPU 100 by images, characters and the like. In a case where the display unit 104 is a touch panel capable of detecting a touch operation, it may also be possible for the display unit 104 to function as part of the operation unit 103.

The external storage device 105 is a large-capacity information storage device represented by a hard disk drive. In the external storage device 105, the OS (Operating System) and computer programs, data and the like for causing the CPU 100 to perform various kinds of processing are saved. Further, the external storage device 105 stores temporary data (for example, image data that is input and output, threshold value matrix used in the image processing unit 106, positional information on non-ejectable nozzle, non-ejection complementation information, density unevenness correction information and the like) generated by the processing of each unit. The computer programs and data stored in the external storage device 105 are read appropriately in accordance with the control by the CPU 100 and stored in the RAM 101 to be the processing target by the CPU 100.

The image processing unit 106 is implemented as a processor capable of executing computer programs or a dedicated image processing circuit and performs various kinds of image processing for converting image data that is input as a printing target into image data that can be output by the image forming unit 107. For example, in a case of receiving instructions to perform image processing from the CPU 100, the image processing unit 106 performs quantization processing for digital image data of N tones (N: natural number) input from the external storage device 105 and outputs image data (halftone image data) quantized into M tones (M; natural number, N>M).

Figure 2:
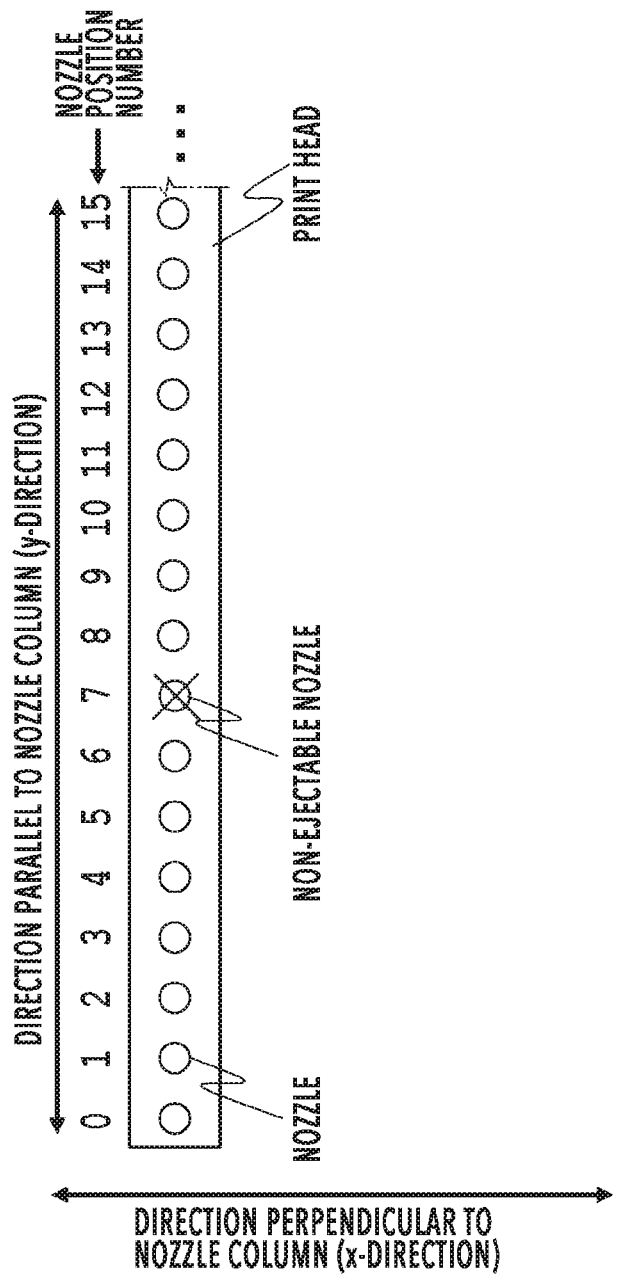
FIG. 2 is a diagram showing a configuration example of a print head.

The image forming unit 107 forms an image on a printing medium by using ink as a printing material based on the halftone image data received from the image processing unit 106. The image forming unit 107 adopts the ink jet method of forming an image by ejecting ink onto a printing medium from nozzles. The print head comprised by the image forming unit 107 has nozzle columns (printing element columns) corresponding to the number of ink colors, in which a plurality of nozzles (printing elements) capable of ejecting ink is arrayed. FIG. 2 is a diagram showing a configuration example of the print head. In a case of an image forming system compatible with color printing, the print head typically mounts four nozzle columns corresponding to each ink of cyan (C), magenta (M), yellow (Y), and black (K). In FIG. 2, for simplification of explanation, only the nozzle column of black (K) is shown schematically. The print head shown in FIG. 2 is a long line head that covers the entire width of the drawing area in the direction parallel to the nozzle column (y-direction). The image forming unit 107 generates a drive signal for controlling the print head based on halftone image data. The print head forms an image on a printing medium by ejecting ink droplets to generate dots while relatively moving the printing medium in the direction perpendicular to the nozzle column (x-direction), which is perpendicular to the direction parallel to the nozzle column, based on the drive signal. In the present embodiment, an example of a case where the nozzle whose nozzle position number is 7 becomes a non-ejectable nozzle is explained.

The non-ejectable nozzle detection unit 108 captures the printing medium output from the image forming unit 107 and acquires information on the image formed on the printing medium. The non-ejectable nozzle detection unit 108 comprises an image sensor (line sensor or area sensor) as an image capturing unit (image reading unit) and has a function to specify the non-ejectable nozzle position by analyzing the acquired captured image. It may also be possible for the image sensor to use an in-line scanner, an offline scanner or the like, not shown schematically, which the image forming system mounts.

The I/F unit 109 functions as an interface for connecting the image forming system and an external device. Further, the I/F unit 109 also functions as an interface for performing transmission and reception of data with a communication device by using infrared communication, a wireless LAN (Local Area Network) and the like, and an interface for connecting to the internet. Each unit described above is connected to the bus 110 and capable of performing transmission and reception of data via the bus 110.

(Function Configuration of Image Processing Unit 106)

Figure 3:
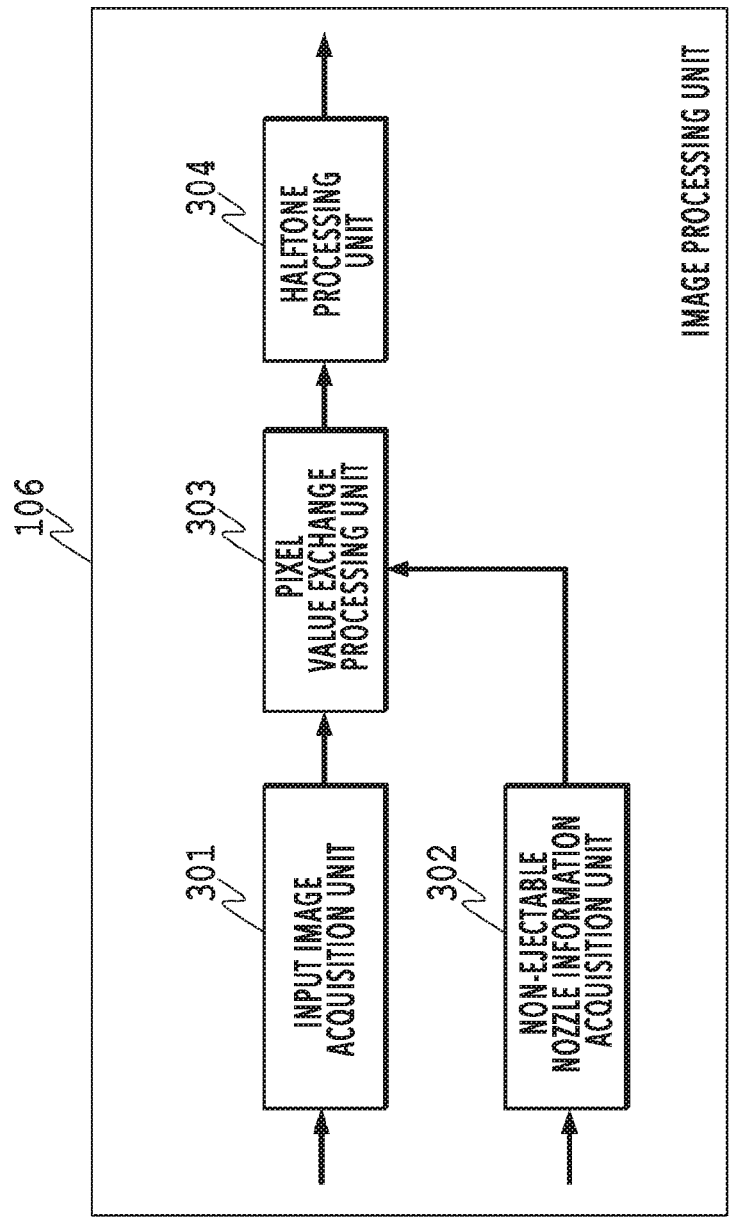
FIG. 3 is a block diagram showing a function configuration of an image processing unit according to a first embodiment.

Next, with reference to the block diagram shown in FIG. 3, the function configuration of the image processing unit 106 according to the present embodiment is explained. The image processing unit 106 performs quantization processing (halftone processing) for reducing the number of tones for input digital image data (hereinafter, referred to as "input image data").

As shown in FIG. 3, the image processing unit 106 has an input image acquisition unit 301, a non-ejectable nozzle information acquisition unit 302, a pixel value exchange processing unit 303, and a halftone processing unit 304. The image processing unit 106 is implemented as a dedicated image processing circuit configuring the block diagram shown in FIG. 3.

The input image acquisition unit 301 acquires printing-target input image data that is input to the image forming system. For example, it is assumed that the specifications of the image forming unit 107 are those that implement an output resolution of 1,200 dpi by using inks of four colors of cyan (C), magenta (M), yellow (Y), and black (K). In this case, the input image data is image data whose resolution of each color of CMYK is 1,200 dpi and which has the number of tones corresponding to eight bits (256 tones). There may be a case where the printing-target input image data has a combination of colors different from CMYK or an image resolution other than 1,200 dpi. In this case, it is sufficient for the input image acquisition unit 301 to acquire image data after being converted into a format that can be handled by the image forming unit 17 by performing preprocessing, such as color conversion and resolution con version.

The non-ejectable nozzle information acquisition unit 302 acquires positional information capable of specifying a non-ejectable nozzle within the nozzle column (hereinafter, called "non-ejectable nozzle information"), which is detected and stored in advance, from the RAM 101 or the external storage device 105. Here, it is assumed that the "non-ejectable nozzle" includes a nozzle in which an abnormality, such as that the ink landing position error increases and exceeds a permissible value, has occurred, in addition to a nozzle that is no longer capable of ejecting ink. That is, in the present specification, the "non-ejectable nozzle" is used as the term referring to a nozzle that is not normal (abnormal nozzle) in which some ejection failure has occurred. Then, in the non-ejectable nozzle information, to which pixel line (pixel group extending in the direction perpendicular to the nozzle column) of the input image data, a nozzle unable to eject ink correctly due to clogging of the nozzle, a failure in the element and the like corresponds is indicated by the above-described nozzle position number. By this non-ejectable nozzle information, it is made possible to specify the pixel line unable to form a dot in the image forming unit 107. The non-ejectable nozzle information is obtained in advance by a publicly known method. As a publicly known method, for example, there is a method of specifying the position of the nozzle unable to eject ink by outputting in advance a non-ejection position detection chart image and analyzing the output results thereof.

The pixel value exchange processing unit 303 performs pixel value exchange processing for obtaining image data whose reproducibility of a line drawing is good by suppressing the disappearance of a line drawing, such as a thin line, which occurs resulting form a non-ejectable nozzle. Specifically, the pixel value exchange processing unit 303 performs processing to exchange the pixel value of the pixel on the pixel line of the non-ejectable nozzle with the pixel value of the pixel on the pixel line of another nozzle capable of ejecting ink normally. In the present embodiment, it is assumed that the pixel value of each pixel of the input image data in which each pixel is represented by eight bits is corrected and converted into corrected image data and output in which each pixel is represented by eight bits.

The halftone processing unit 304 generates halftone image data by performing conversion processing into the number of tones that the image forming unit 107 can represent for the multi-valued input image data after the pixel value exchange processing and processing to determine arrangement of dots formed by each nozzle within the nozzle column. Specifically, input image data in which each pixel is represented by eight bits is converted into 1-bit binary halftone image data in which each pixel has a value of "0" or "1". In the halftone image data, the pixel whose pixel value (output value) is "0" indicates off of the dot and the pixel whose pixel value is "1" indicates on of the dot. Then, it can be said that the halftone image data such as this represents the input image data in a pseudo manner by the number of tones smaller than the number of tones of the input image data. In the present embodiment, it is possible to apply the error diffusion processing, the dither processing and the like, which are publicly known methods, as the halftone processing.

(Details of Pixel Value Exchange Processing Unit)

Figure 4:
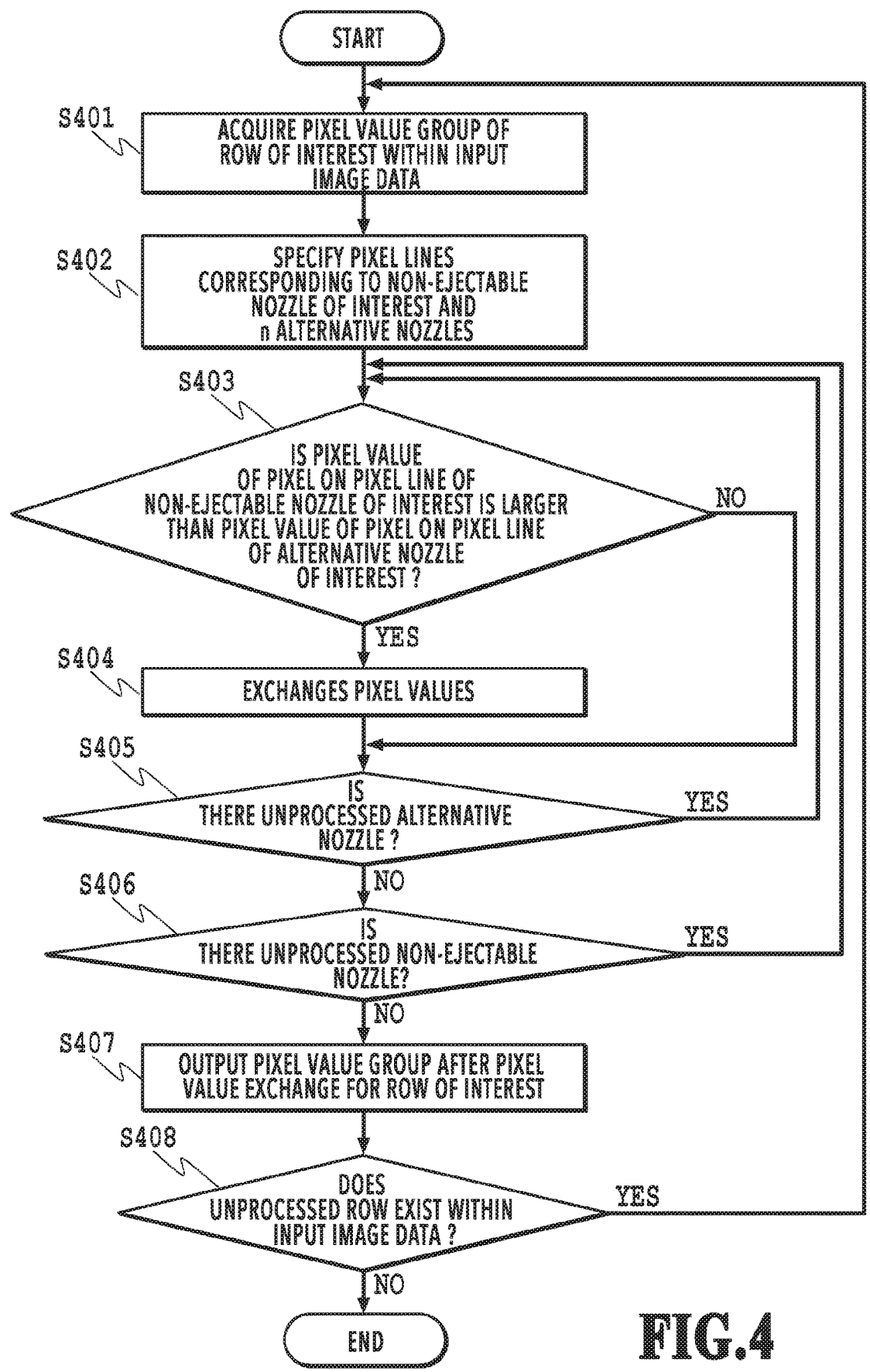
FIG. 4 is a flowchart showing a flow of processing in a pixel value exchange processing unit.

Next, a flow of processing in the pixel value exchange processing unit 303 according to the present embodiment is explained in detail with reference to the flowchart shown in FIG. 4. Symbol "S" in the explanation of the flowchart indicates a step. This is also the same in the explanation of the flowcharts of the second and subsequent embodiments.

Figures 5A, 5B, 5C:
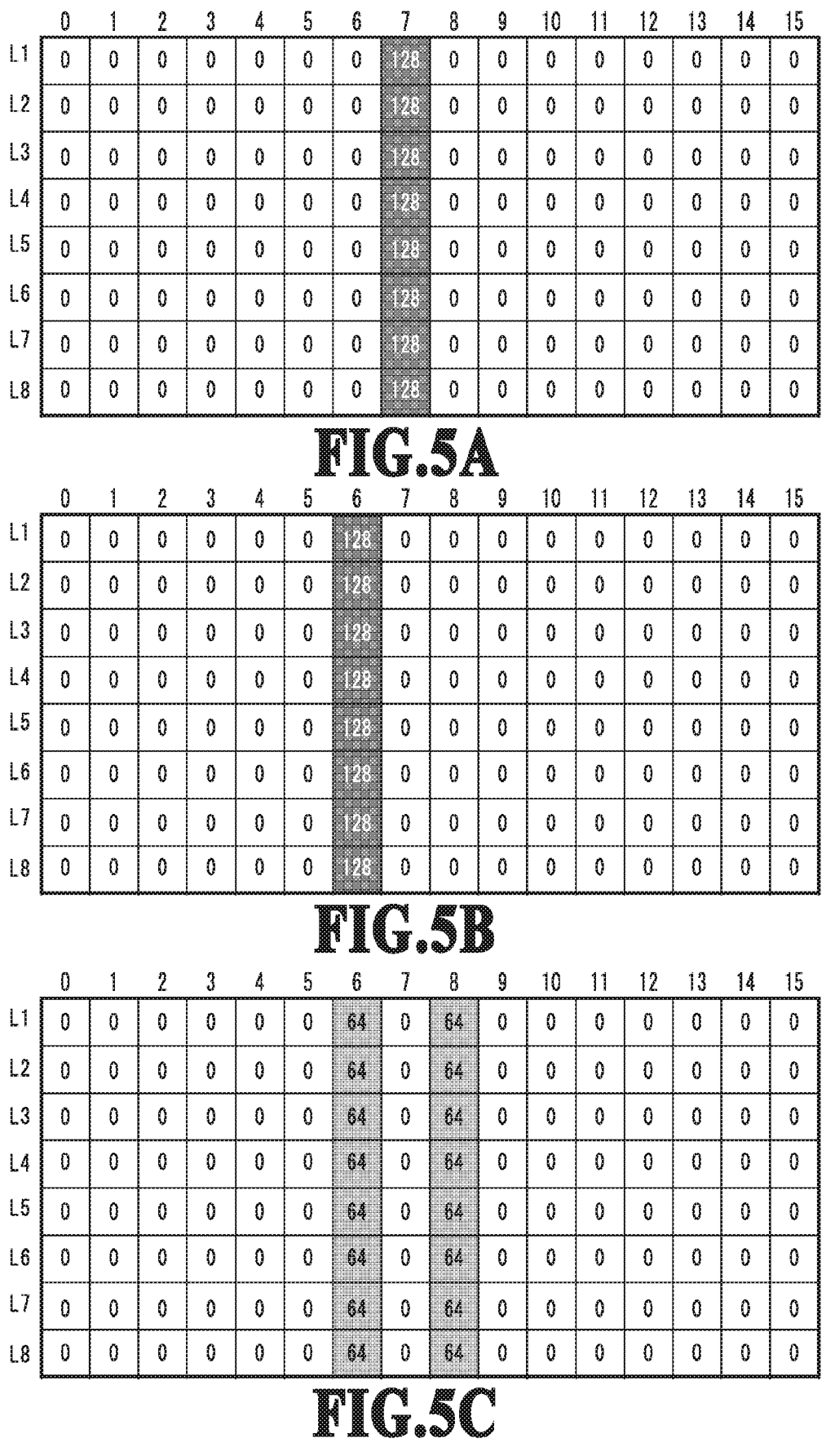

First, at S401, image data (pixel value group) corresponding to one row on which attention is focused within the input image data received from the input image acquisition unit 301 is acquired. FIG. 5A shows an example of input image data whose image size is 8 pixels×16 pixels. The numerical value of each pixel within the input image data shown in FIG. 5A indicates the tone value. The figures "0" to "15" attached to the top of the image are nozzle position numbers corresponding to the pixel line extending in the direction perpendicular to the nozzle column and it is assumed that these numbers match with the nozzle position numbers in the print head shown in FIG. 2 described previously. Further, symbols "L1" to "L8" attached to the left portion of the input image data are the row numbers indicating the print position in the direction perpendicular to the nozzle column (hereinafter, called "print position number"). Normally, the row is selected as the row of interest in order from the row whose storage position number is L1 and the pixel value group corresponding to one row in the selected row of interest is acquired.

Next, at S402, based on the non-ejectable nozzle information received from the non-ejectable nozzle information acquisition unit 302, the pixel line corresponding to the non-ejectable nozzle of interest among all the non-ejectable nozzles within the target nozzle columns and the pixel lines corresponding to the n alternative nozzles, which are candidates of pixel value exchange, are specified. In the present embodiment, it is assumed that the No. 7 nozzle is specified as the non-ejectable nozzle by the non-ejectable nozzle information. In this case, the No. 7 nozzle is the non-ejectable nozzle of interest and in the input image data shown in FIG. 5A, the No. 7 pixel line, in which the tone value is indicated by solid-white figures on the gray background, is specified as the pixel line corresponding to the non-ejectable nozzle of interest. Further, in the present embodiment, n is set to 2 (n=2) and two alternative nozzles are set and the pixel lines corresponding to the No. 6 and No. 8 nozzles adjacent to the left and right of the non-ejectable nozzle are specified as a "pixel line corresponding to the first alternative nozzle" and a "pixel line corresponding to the second alternative nozzle", respectively. It may also be possible to specify the No. 8 nozzle as the first alternative nozzle and the No. 6 nozzle as the second alternative nozzle. In either case, it is desirable to fix the pixel line corresponding to each alternative nozzle irrespective of the print position number. Further, it may also be possible to set n to 1 (n=1) and set only one pixel line corresponding to one of the No. 6 and No. 8 nozzles as the "pixel line corresponding to the (first) alternative nozzle". Alternatively, it may also be possible to set n to 4 (n=4) and set the pixel lines corresponding to the No. 5 and No. 9 nozzles as a "pixel line corresponding to the third alternative nozzle" and a "pixel line corresponding to the fourth alternative nozzle", respectively.

Next, at S403, among the pixel value group of the row of interest acquired at S401, the pixel value on the pixel line of the non-ejectable nozzle of interest specified at S402 and the pixel value on the pixel line of the alternative nozzle of interest are compared. At this time, in a case where up to the fourth alternative nozzle is set as described above, the alternative nozzle is selected as the alternative nozzle of interest in order from the first alternative nozzle. That is, the pixel value on the pixel line corresponding to the alternative nozzle whose distance to the non-ejectable nozzle is shorter is compared and exchanged with a higher priority. In a case where the results of the comparison indicate that the pixel value on the pixel line of the non-ejectable nozzle of interest is larger, the processing advances to S404. On the other hand, in a case where the pixel value on the pixel line of the non-ejectable nozzle of interest is less than or equal to the pixel value on the pixel line of the alternative nozzle of interest, the processing advances to S405.

At S404, the two pixel values compared at S403 are exchanged. That is, the value that is the pixel value on the pixel line of the non-ejectable nozzle of interest becomes anew the pixel value on the pixel line of the alternative nozzle of interest. Then, the value that is the pixel value on the pixel line of the alternative nozzle of interest becomes anew the pixel value on the pixel line of the non-ejectable nozzle of interest.

Next, at S405, whether or not the processing at S403 to S404 has been completed for all the set alternative nozzles is determined. In a case where the processing has been completed for all the n alternative nozzles, the processing advances to S406. On the other hand, in a case where there is an unprocessed alternative nozzle, the processing returns to S403, and the next alternative nozzle of interest is determined and the same processing is repeated. In the repeated processing, the pixel value on the pixel line of the non-electable nozzle of interest, which is compared at S403, is the pixel value after being exchanged at S404.

Next, at S406, whether or not the processing at S403 to S405 has been completed for all the non-ejectable nozzles is determined. In a case where the processing has been completed for all the non-ejectable nozzles specified by the non-ejectable nozzle information, the processing advances to S407. On the other hand, in a case where there is an unprocessed non-ejectable nozzle, the processing returns to S403, and the next non-ejectable nozzle of interest is determined and the same processing is repeated.

At S407, image data (pixel value group) corresponding to one row for which the pixel value exchange of the row of interest has been completed is output to the halftone processing unit 304. At S408 that follows, whether or not the processing has been completed for all the rows within the input image data is determined. In a case where there is an unprocessed row, the processing returns to S401, and the next row is determined as the row of interest and the same processing is repeated. On the other hand, in a case where the processing has been completed for all the rows within the input image data, this processing is terminated.

The above is the contents of the processing in the image processing 106 according to the present embodiment. In a case where the input image data in FIG. 5 is processed in accordance with the flow in FIG. 4, image data after the pixel value exchange is output in units of rows of L1 to L8. However, it may also be possible to output the processing results to the halftone processing unit 304 at the point in time of completion of the processing of the entire input image data.

FIG. 5B shows image data after the pixel value exchange is performed for the input image data in FIG. 5A. As shown in FIG. 5B, the input image data has changed so that the dot to be formed by the No. 7 nozzle is formed by the No. 6 nozzle. That is, the thin line with a width of one pixel to be drawn by the No. 7 non-ejectable nozzle is drawn by the No. 6 alternative nozzle.

Further, in the present embodiment, the pixel lines corresponding to the first alternative nozzle and the second alternative nozzle respectively are fixed irrespective of the print position number, and therefore, exchange is performed so that the pixel value of the pixel of the non-ejectable nozzle is distributed to one of the pixel lines with priority. Because of this, unlike the case where the pixel value of the adjacent nozzle is corrected based on the pixel value of the non-ejectable nozzle, which is the conventional pixel value correction technique, it is possible to obtain good reproducibility of a thin line, with the collapse of a dot pattern being suppressed.

FIG. 5C shows image data after applying the conventional pixel value correction technique to the input image data in FIG. 5A for a comparison with a case where the present embodiment is applied. Further, FIG. 6A to FIG. 6C show the results obtained by performing halftone processing for each piece of image data shown in FIG. 5A to FIG. 5C. In a case where an image is formed by using the halftone image data shown in FIG. 6A, for which the correction processing has not been performed at all, the No. 7 nozzle, which is the non-ejectable nozzle, cannot form a dot, and therefore, the thin line is not drawn and disappears. Further, in a case where an image is formed by using the halftone image data shown in FIG. 6C, for which the conventional pixel value correction has been performed, it is known that the dot pattern has collapsed. In contrast to this, in a case of the halftone image data shown in FIG. 6B, for which the present embodiment has been performed, it is known that there is no collapse of the dot pattern, such as that in the halftone image data in FIG. 6C, and that it is possible to form a thin line whose reproducibility is good. In the halftone image data in FIG. 6B, for which the present embodiment has been applied, compared to the halftone image data in FIG. 6A, the centroid of the thin line is shifted by one pixel. However, it is possible to evaluate that the degree of influence given to the image quality is relatively small compared to the disappearance of the thin line itself and the collapse of the dot pattern.

Modification Example

In the present embodiment, the pixel line corresponding to the non-ejectable nozzle and the pixel line corresponding to the alternative nozzle are specified respectively and the pixel values of the pixels on the pixel lines are exchanged. However, it may also be possible to directly exchange the pixel value of the pixel located at the non-ejectable nozzle position and the pixel value of the pixel adjacent to the left or right of the pixel at the non-ejectable nozzle position based on the non-ejectable nozzle information. For example, for the input image data in FIG. 5A, the pixel of interest is searched for sequentially from left to right and in a case where the pixel of interest is the pixel at the non-ejectable nozzle position, the pixel value of the pixel of interest and the pixel value of the pixel located to the left thereof are compared, and on a condition that the pixel value of the pixel of interest is larger, exchange is performed. By the method such as this, it is also made possible to form a thin line whose reproducibility is good.

Further, in the present embodiment, in a case where the pixel value of the pixel on the pixel line of the non-ejectable nozzle is larger than the pixel value of the pixel on the pixel line of the alternative nozzle, the pixel values are exchanged. However, it may also be possible to perform comparison and exchange with the pixel value of the pixel on the pixel line of the alternative nozzle only in a case where the pixel value of the pixel on the pixel line of the non-ejectable nozzle is larger than a predetermined tone value (for example, 200). Due to this, it is possible to apply the present embodiment by taking only a dark thin line having a tone value higher than or equal to a predetermined value as a target. In this situation, even in a case where the exchange of the pixel value is performed for the pixel on the pixel line of the alternative nozzle, whose pixel value is larger, the pixel on the pixel line of the non-ejectable nozzle has a high tone value, and therefore, the trouble resulting from that is small. Consequently, it may also be possible to perform exchange uniformly irrespective of the magnitude of the pixel value.

As above, according to the present embodiment, at the time of drawing a line drawing, such as a thin line, it is possible to form an image whose reproducibility of a line drawing is good by suppressing the disappearance of a line drawing, which may occur resulting from the non-ejectable nozzle.

Second Embodiment

Next, an aspect is explained as a second embodiment, in which after the pixel value exchange processing explained in the first embodiment is performed, so-called non-ejection complementation processing to form a dot to be formed by a non-ejectable nozzle by another nozzle complementing the dot. The same symbol is attached to the same configuration as that of the first embodiment and detailed explanation is omitted.

(Function Configuration of Image Processing Unit)

Figure 7:
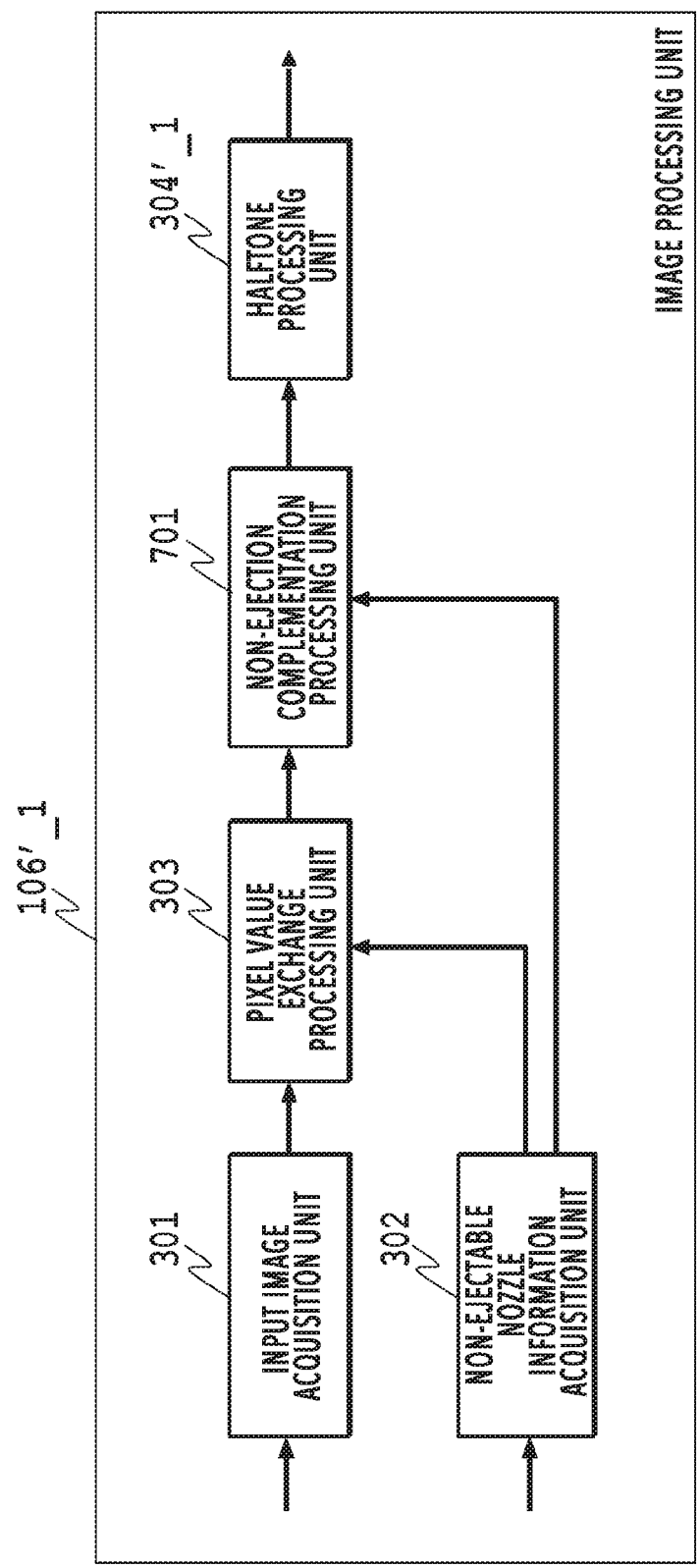
FIG. 7 is a block diagram showing a function configuration of an image processing unit according to a second embodiment.

FIG. 7 is a block diagram showing a detailed configuration of an image processing unit 106'_1 according to the present embodiment. The image processing unit 106'_1 in FIG. 7 comprises the input image acquisition unit 301, the non-ejectable nozzle information acquisition unit 302, the pixel value exchange processing unit 303, a non-ejection complementation processing unit 701, and a halftone processing unit 304'_1.

The non-ejection complementation processing unit 701 performs processing to complement the density that should be assumed to be obtained by the non-ejectable nozzle specified by the non-ejectable nozzle information by another nozzle (also called "density complementation processing"). Specifically, the non-ejection complementation processing unit 701 performs processing to distribute the pixel value corresponding to the dot to be formed by the non-ejectable nozzle to another nozzle located at a position in the vicinity of the non-ejectable nozzle. It may be possible to apply a publicly known method to the non-ejection complementation processing.

(Details of Image Processing Unit)

Figure 8:
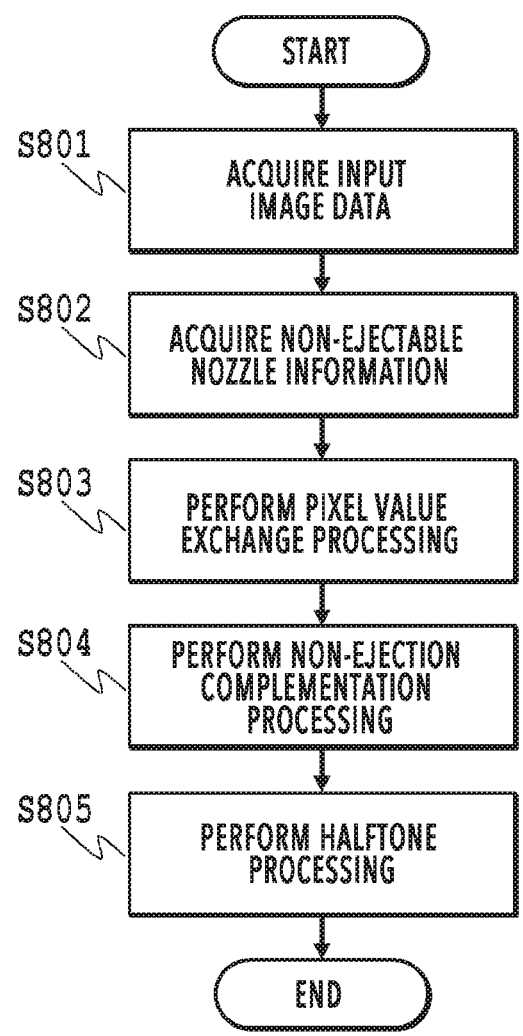
FIG. 8 is a flowchart showing a flow of processing in the image processing unit according to the second embodiment.

Next, a flow of processing in the image processing unit 106'_1 according to the present embodiment is explained in detail with reference to the flowchart shown in FIG. 8.

Figures 9A, 9B:
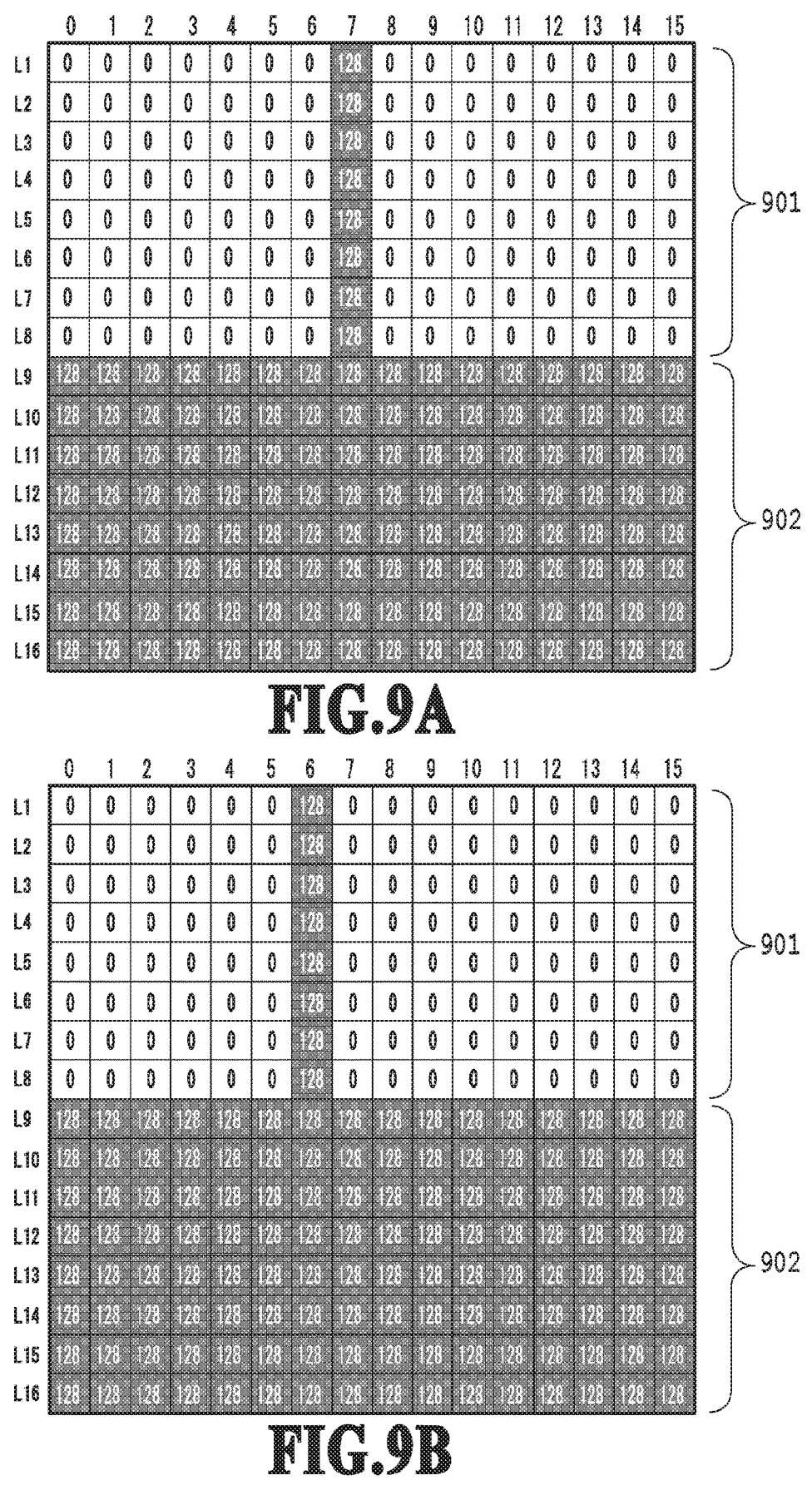

First, at S801, the input image acquisition unit 301 acquires input image data. Here, it is assumed that the input image data shown in FIG. 9A is acquired. The input image data in FIG. 9A includes a thin line area 901 in which white pixels exist around a thin line whose width is one pixel and a solid area 902 in which no white pixel exists.

Next, at S802, the non-ejectable nozzle information acquisition unit 302 acquires non-ejectable nozzle information prepared in advance from the RAM 101 or the external storage device 105. Here, it is assumed that information specifying the No. 7 nozzle position as the non-ejectable nozzle position is acquired.

Next, at S803, the pixel value exchange processing unit 303 performs the pixel value exchange processing (see the flow in FIG. 4) explained in the first embodiment based on the non-ejectable nozzle information acquired at S802 for the input image data acquired at S801. FIG. 9B shows image data after the pixel value exchange processing is performed for the input image data in FIG. 9A. In the thin line area 901 in the image data shown in FIG. 9B, by the pixel value exchange, the pixel value of each pixel on the pixel line corresponding to the No. 6 nozzle has changed from "0" to "128". Further, the pixel value of each pixel on the pixel line corresponding to the No. 7 nozzle has changed from "128" to "0". That is, the image data has changed so that the thin line to be formed by the No. 7 nozzle, which is the non-ejectable nozzle, is formed by the No. 6 alternative nozzle. On the other hand, in the solid area 902, the pixel value of each pixel on the pixel lines corresponding to both the No. 6 nozzle and the No. 8 nozzle as the alternative nozzles is already a pixel value larger than "0". Because of this, even in a case where the pixel value exchange is performed with each pixel on the pixel line of the non-ejectable nozzle, it is not possible to complement all the dots (densities corresponding to the dots) to be formed by the non-ejectable nozzle and the alternative nozzle. Consequently, in order to deal with this, at next S804, non-ejection complementation processing is performed.

Figures 9C, 9D:
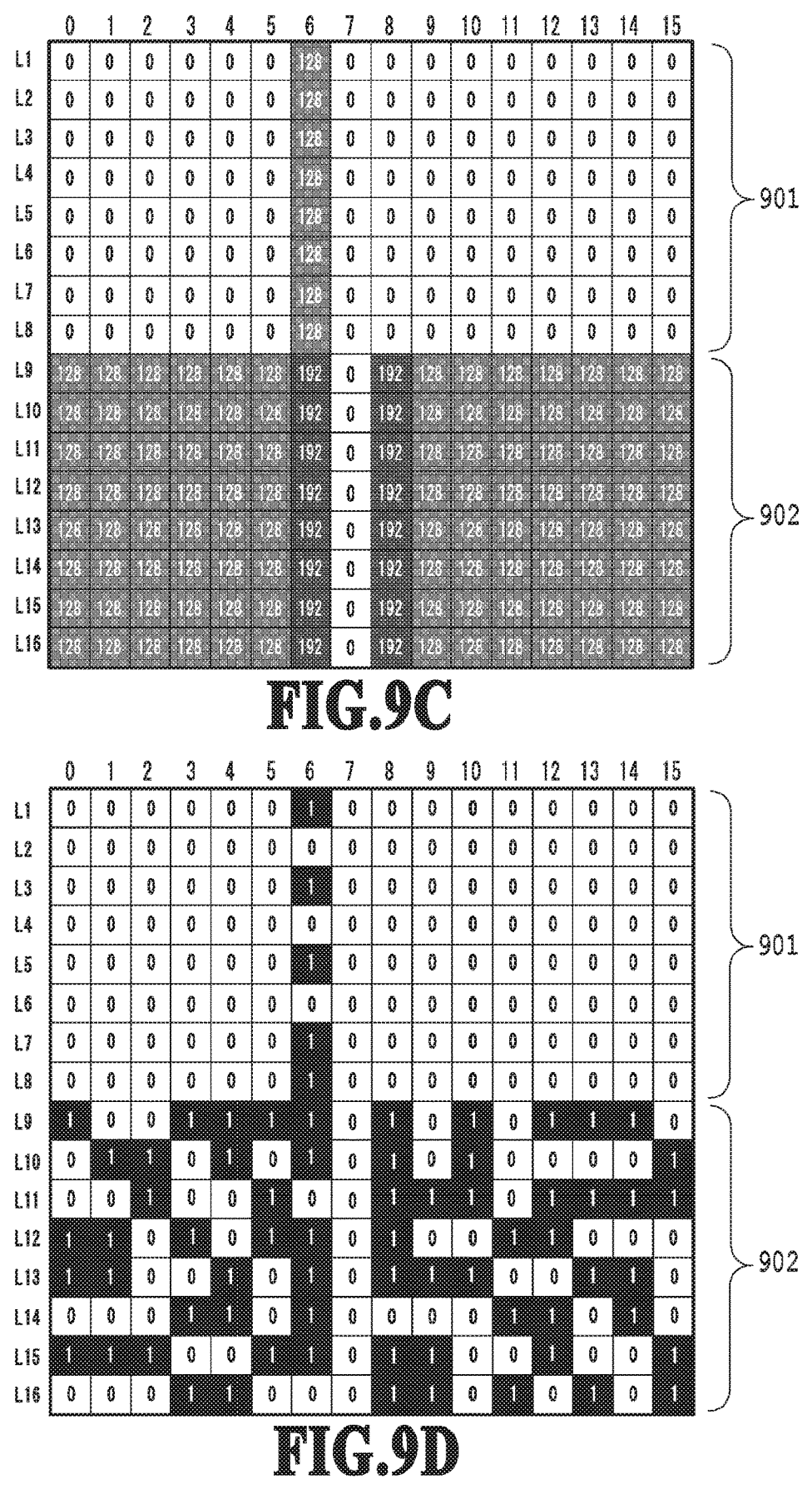

At S804, the non-ejection complementation processing unit 701 performs non-ejection complementation processing based on the non-ejectable nozzle information acquired at S802 for the image data after the pixel value exchange processing is performed at S803. Specifically, the non-ejection complementation processing unit 701 performs processing to distribute half of the pixel values on the pixel line corresponding to the non-ejectable nozzle to the respective pixels on the pixel lines of the adjacent nozzles located on the left and right of the non-ejectable nozzle. FIG. 9C shows the image data after the non-ejection complementation processing is performed for the image data after the pixel value exchange shown in FIG. 9B. As shown in FIG. 9C, by the non-ejection complementation processing, in the solid area 902, the density corresponding to the dot to be formed by the non-ejectable nozzle is complemented by the adjacent nozzles located on the left and right of the non-ejectable nozzle.

Next, at S805, the halftone processing unit 304'_1 generates halftone image data by performing halftone processing for the image data after the non-ejection complementation processing is performed at S804. FIG. 9D shows the halftone image data obtained by performing halftone processing for the image data after the non-ejection complementation processing shown in FIG. 9C. As shown in FIG.

9D, the pixel values are replaced so that the dot to be formed by the non-ejectable nozzle is formed by the alternative nozzle by the pixel value exchange processing at S803, and therefore, the collapse of the dot pattern is suppressed in the thin line area 901. Due to this, it is made possible to favorably reproduce the thin line. Further, in the solid area 902 also, the pixel value of each pixel on the pixel line of the non-ejectable nozzle is distributed to the pixels on the pixel lines of the adjacent nozzles thereof to complement the density by the non-ejection complementation processing at S804, and therefore, streak and unevenness that occur resulting from the non-ejectable nozzle are suppressed. Then, in the thin line area 901, by the above-described pixel value exchange, the pixel values corresponding to the non-ejectable nozzle are moved to the alternative nozzle, and therefore, even in a case where the non-ejection complementation processing is performed after that, the collapse of the dot pattern does not occur. That is, by performing the non-ejection complementation processing after performing the pixel value exchange processing, both pieces of processing do not interfere with each other, and therefore, it is made possible to sufficiently obtain both the effects of both pieces of processing.

As above, according to the present embodiment, in a case where a line drawing area, such as a thin line, and a solid area exist in a mixed manner within an input image, it is possible to form an image whose reproducibility of a line drawing is good by suppressing the disappearance of a thin line and the occurrence of steak and unevenness on an image, which may occur resulting from a non-ejectable nozzle.

Third Embodiment

In the second embodiment, the aspect is explained in which the pixel value in the input image data is corrected in the non-ejection complementation processing that is performed following the pixel value exchange processing. Next, an aspect is explained as a third embodiment in which it is premised that dither processing is performed as halftone processing and as non-ejection complementation processing, a threshold value matrix for dither processing is corrected based on non-ejectable nozzle information. The same symbol is attached to the same configuration as that of the first and second embodiments and detailed explanation is omitted.

(Function Configuration of Image Processing Unit)

Figure 10:
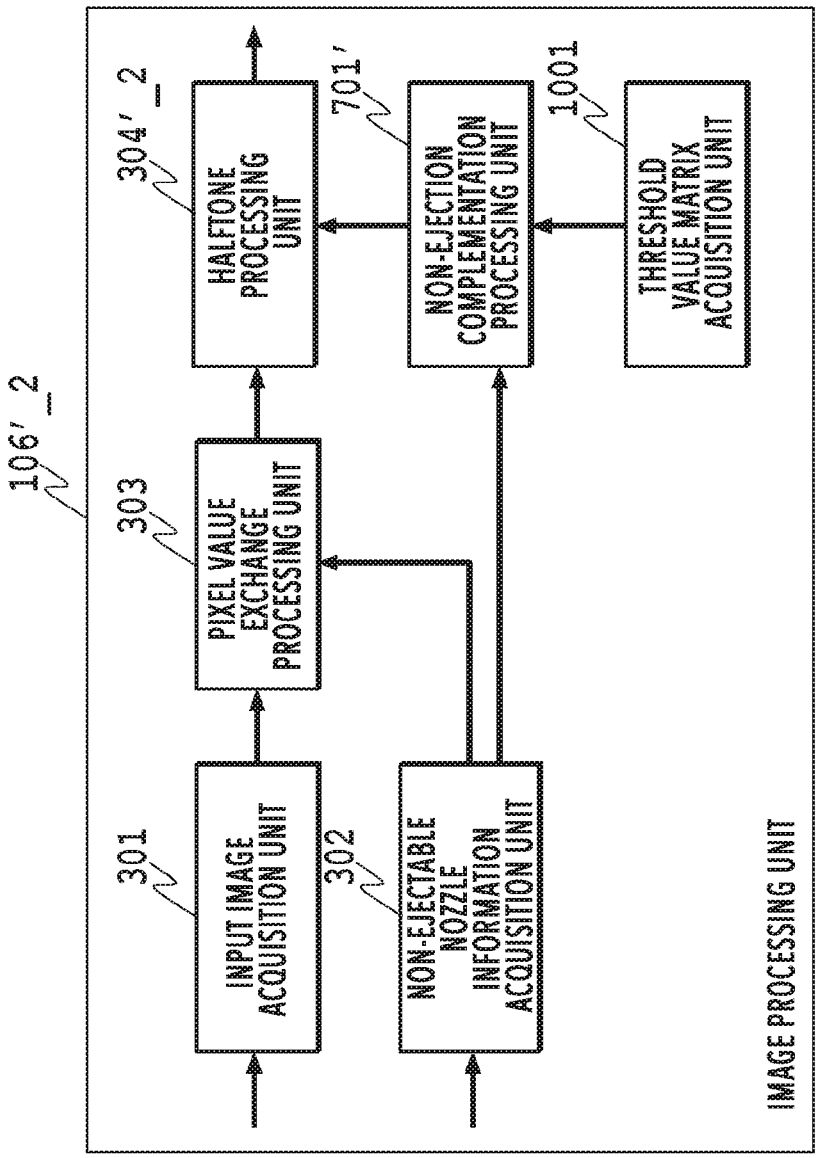
FIG. 10 is a block diagram showing a function configuration of an image processing unit according to a third embodiment.

FIG. 10 is a block diagram showing a detailed configuration of an image processing unit 106'_2 according to the present embodiment. The image processing unit 106'_2 in FIG. 10 comprises the input image acquisition unit 301, the non-ejectable nozzle information acquisition unit 302, the pixel value exchange processing unit 303, a threshold value matrix acquisition unit 1001, a non-ejection complementation processing unit 701', and a halftone processing unit 304'_2.

The threshold value matrix acquisition unit 1001 acquires a dither processing threshold value matrix prepared in advance from the RAM 101 or the external storage device 105. Here, it is assumed that the dither processing means processing to determine on or off of a dot by comparing the pixel value of each pixel in input image data and the threshold value corresponding thereto in order to reproduce a halftone. Then, in the present embodiment, in a case where the pixel value is larger than or equal to the threshold value, the output value is set to 1 to indicate on of the dot and in a case where the pixel value is less than the threshold value, the output value is set to "0" to indicate off of the dot. FIG. 11A shows an example of a threshold value matrix whose size is the same as that of the input image data of 16 pixels×16 pixels shown in FIG. 9A described previously. Each numerical value within the threshold value matrix indicates the threshold value that is compared with each pixel value in the input image data. In a case where the width of the threshold value matrix is less than the image width, by sequentially developing the threshold value matrix in a tiling manner, the entire image width is covered.

Figure 11C:
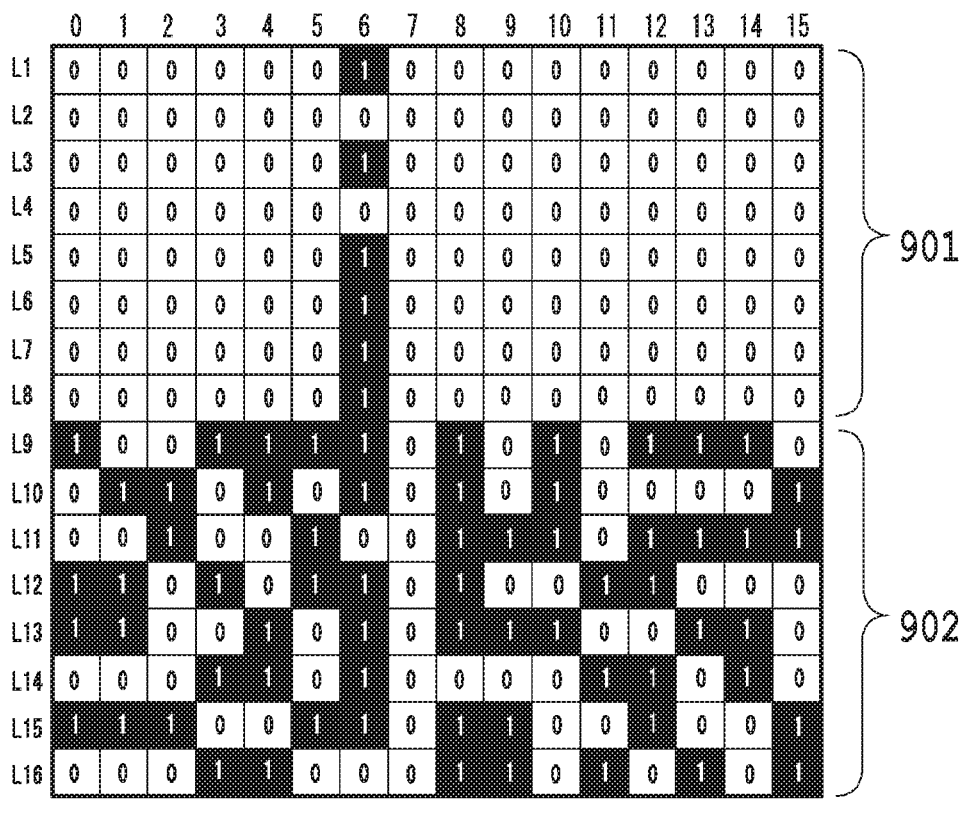
Figure 12:
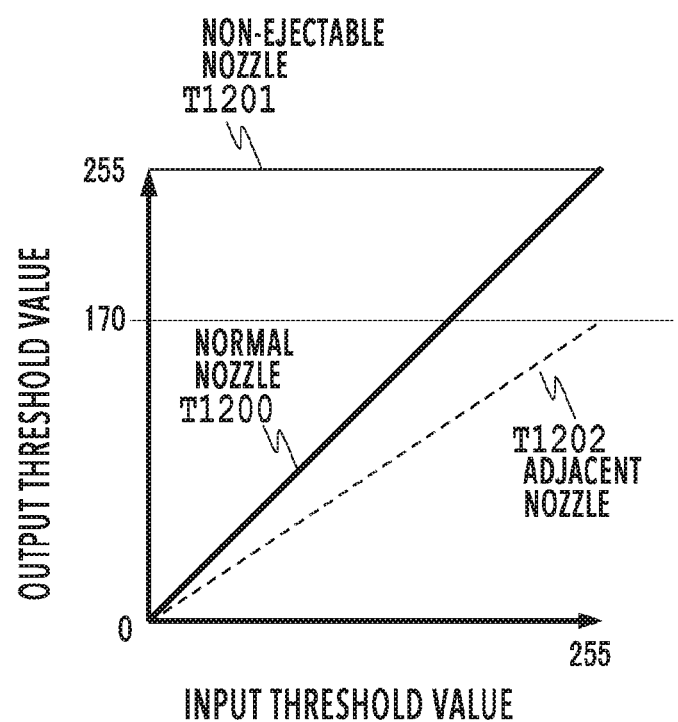
FIG. 12 is a diagram showing an example of correction information in an LUT format.

The non-ejection complementation processing unit 701' performs non-ejection complementation processing to correct the threshold value within the threshold value matrix based on correction information for the adjacent nozzle, which is prepared in advance, and non-ejectable nozzle information so that the density that should be assumed to be obtained by the non-ejectable nozzle is complemented by the adjacent nozzle. FIG. 12 shows an example of the correction information in the LUT format. In the LUT in FIG. 12, the relationship between the input threshold value and the output threshold value corresponding to the non-ejectable nozzle is indicated by a thin solid line T1201 and the relationship between the input threshold value and the output threshold value corresponding to the adjacent nozzle is indicated by a dotted line T1202. In addition, for comparison, the relationship between the input threshold value and the output threshold value corresponding to the normal nozzle, which is not the correction target, is indicated by a thick solid line T1200. In a case of the LUT shown in FIG. 12, from the comparison between the dotted line T1202 and the thick solid line T1200, the correction characteristic is that a threshold value 1/1.5 times that of the normal nozzle is obtained for the adjacent nozzle. That is, in a halftone image obtained by the comparison between the threshold value after being corrected by using the LUT in FIG. 12 and the input tone value, an ink ejection amount 1.5 times that of the normal nozzle is obtained. Due to this, by the two alternative nozzles located on both sides of the non-ejectable nozzle, the dot (density corresponding to the dot) to be formed by the non-ejectable nozzle is complemented. On the other hand, for the non-ejectable nozzle, as indicated by the thin solid line 1201, all the threshold values after the correction are the maximum value "255". That is, control is performed so that the dot is off at all the times and ejection of ink is not performed in a case where a halftone image is generated by the comparison with the input tone value. FIG. 11B shows the threshold value matrix after performing the non-ejection complementation processing by using the LUT in FIG. 12 for the threshold value matrix shown in FIG. 11A described above. In the threshold value matrix in FIG. 11B, the threshold values on the matrix lines corresponding to the No. 6 and No. 8 adjacent nozzles have become small compared to those before the non-ejection complementation processing. Then, all the threshold values on the matrix line corresponding to the non-ejectable nozzle whose nozzle position number is 7 are "255", which is the maximum value. That is, it is known that the threshold value matrix is corrected so that ink ejection is not performed from the non-ejection nozzle and the density that is originally to be assumed to be obtained by the non-ejectable nozzle is complemented by the adjacent nozzles.

The halftone processing unit 304'_2 generates halftone image data by performing dither processing by using the threshold value matrix for which correction has been performed by the non-ejection complementation processing unit 701' for the image data after the pixel value exchange processing. FIG. 11C shows halftone image data obtained by performing dither processing for the image data after the pixel value exchange processing in FIG. 9B by using the threshold value matrix after the non-ejection complementation processing in FIG. 11B. As in the halftone image data in FIG. 9D described previously, it is known that streak and unevenness that occur resulting from the non-ejectable nozzle are suppressed by complementing the density by distributing the pixel value of each pixel on the pixel line of the non-ejectable nozzle to the pixels on the pixel lines of the adjacent nozzles while suppressing the collapse of the dot pattern in the thin line area 901. In the thin line area 901 in FIG. 11C, the thin line becomes to have a higher density because the on dots increase in number compared to that of the thin line area 901 in FIG. 9D, but it is possible to evaluate that the degree of influence given to the image quality is low compared to the disappearance of the thin line itself and the collapse of the dot pattern. Further, in a case where the pixel value on the pixel line corresponding to the non-ejectable nozzle becomes "0" due to the pixel value exchange, it may also be possible to return the threshold values on the matrix lines corresponding to the adjacent nozzles to the threshold values before the correction. In this case, it is possible to prevent the density of the thin line from changing.

Fourth Embodiment

In the second embodiment, the aspect is explained in which the non-ejection complementation processing is performed for the image data after the pixel value exchange. Next, an aspect is explained as a fourth embodiment in which head shading processing is performed for image data after pixel value exchange. Here, the head shading processing is a technique to perform correction so that the output density in each nozzle is appropriate by finding the density characteristic of each nozzle by performing test printing. It is also possible to obtain the same effect as that of the second embodiment by performing the head shading processing in place of the non-ejection complementation processing. The same symbol is attached to the same configuration as that of the preceding embodiments and detailed explanation is omitted.
(Function Configuration of Image Processing Unit)

Figure 13:
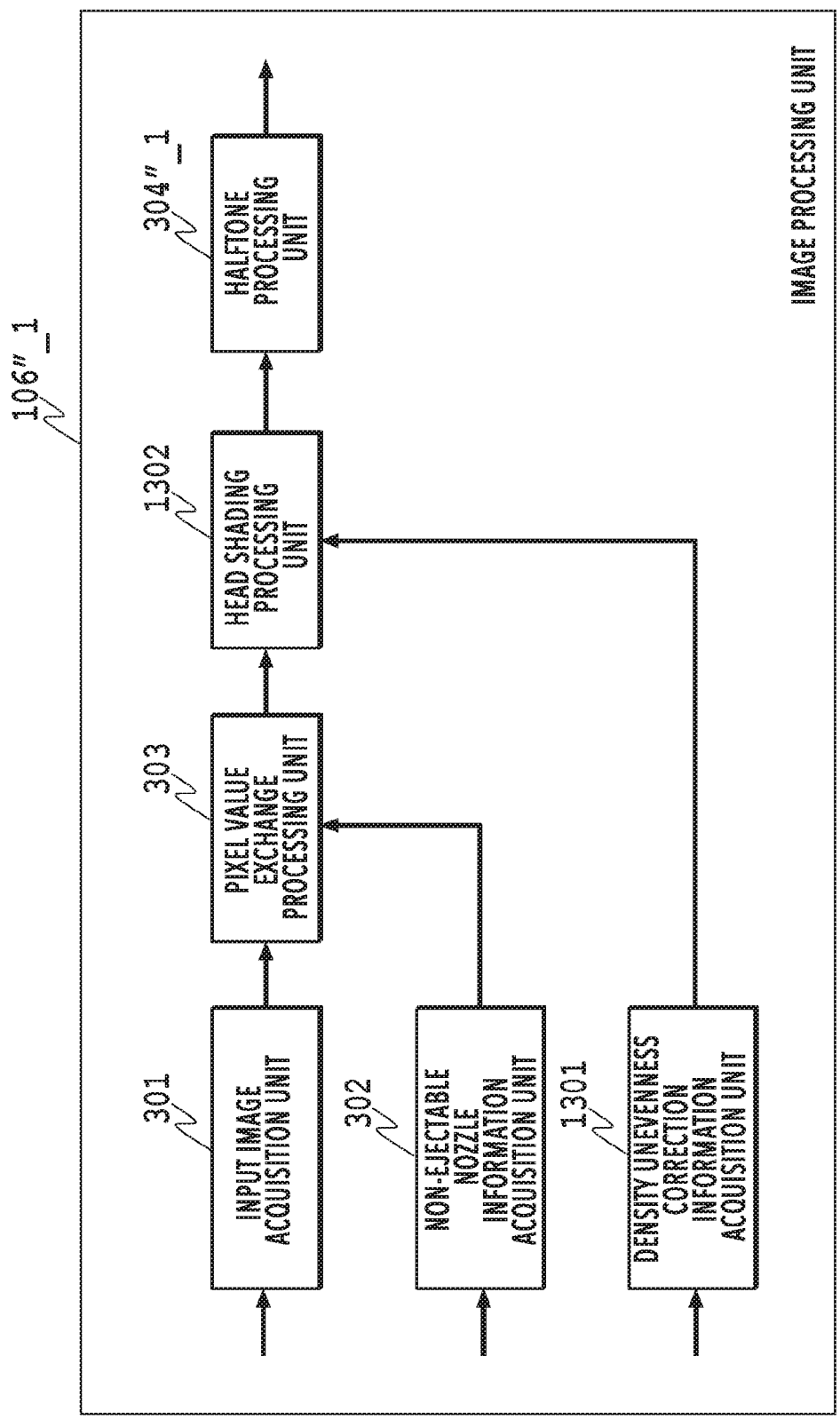
FIG. 13 is a block diagram showing a function configuration of an image processing unit according to a fourth embodiment.

FIG. 13 is a block diagram showing a detailed configuration of an image processing unit 106"_1 according to the present embodiment. The image processing unit 106"_1 in FIG. 13 comprises the input image acquisition unit 301, the non-ejectable nozzle information acquisition unit 302, the pixel value exchange processing unit 303, a density unevenness correction information acquisition unit 1301, a head shading processing unit 1302, and a halftone processing unit 304"_1.

The density unevenness correction information acquisition unit 1301 acquires information (density unevenness correction information) for performing correction so that the printing density at each nozzle position, which is detected and stored in advance, approaches the target density from the RAM 101 or the external storage device 105. It is possible to obtain the density unevenness correction information by reading the print output results of a predetermined density pattern (test pattern) with an in-line sensor or the like and measuring the density of each nozzle and by finding a correction coefficient that does not cause density unevenness for each nozzle. The density unevenness correction information is stored in the lookup table (LUT) format or in the function format.

The head shading processing unit 1302 refers to the above-described density unevenness correction information and performs processing to convert the pixel value on the pixel line corresponding to each nozzle within the input image data into a pixel value in accordance with the density characteristic of each nozzle. Due to this, the density correction taking also into consideration the influence of the non-ejectable nozzle is performed as a result, and therefore, it is possible to suppress trouble on an image, such as streak and unevenness. Here, the head shading processing acts on the pixel on the pixel line of the non-ejectable nozzle so that the density becomes higher. Consequently, in a case where the non-ejectable nozzle recovers naturally and it is made possible for the non-ejectable nozzle to eject ink droplets, a black streak occurs along the pixel line of the non-ejectable nozzle. In order to avoid this, normally, for the non-ejectable nozzle, processing to disable ejection of ink droplets is performed. Even in the situation such as this, in the case of the present embodiment, the pixel value of the pixel on the pixel line of the non-ejectable nozzle and the pixel value of the pixel on the pixel line of the alternative nozzle are exchanged, and therefore, the disappearance of a thin line is suppressed. Further, in the pixel value exchange processing, the pixel values are exchanged only between the pixel line of the non-ejectable nozzle and the pixel line of the alternative nozzle, and therefore, there is only a slight change in an image whose tone is uniform. Because of this, also in the head shading processing that is applied following the pixel value exchange processing, it is made possible to obtain the effect sufficiently.

Modification Example

Figure 14:
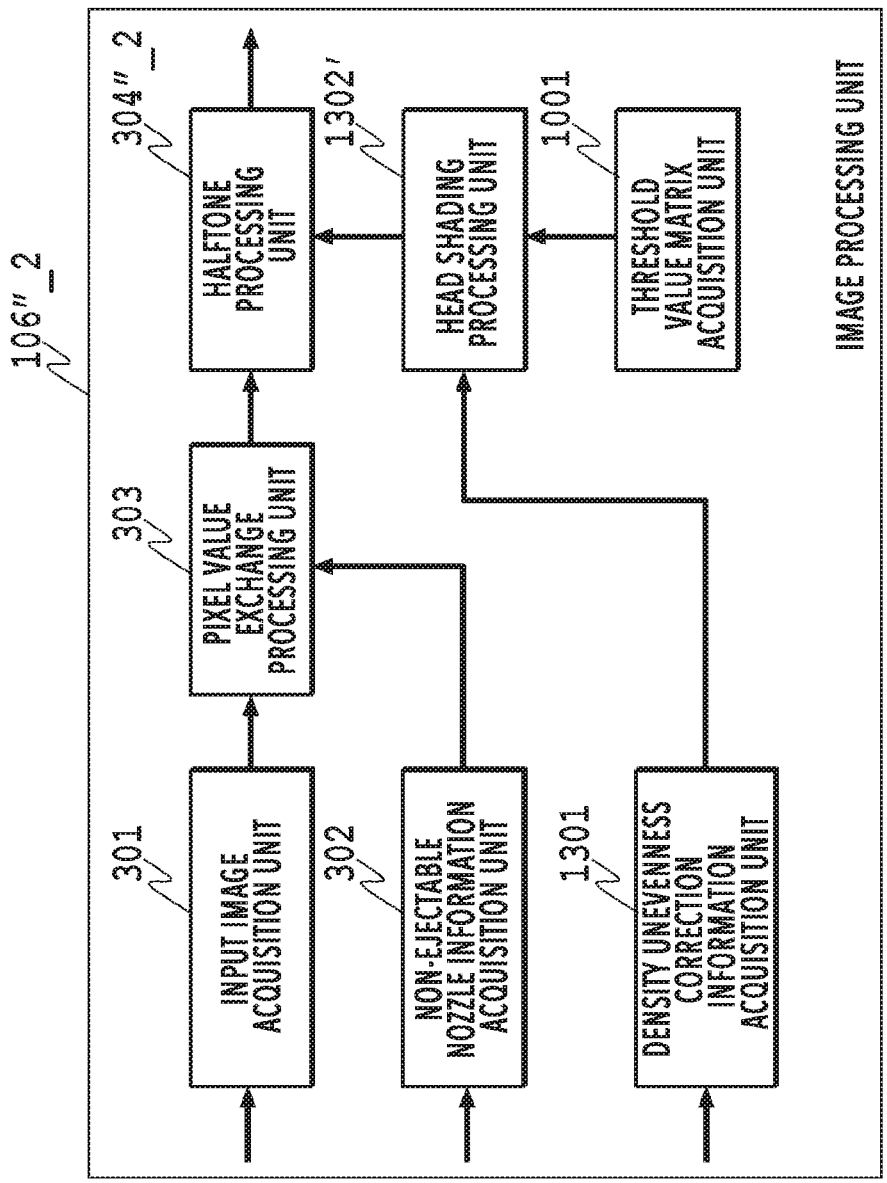
FIG. 14 is a block diagram showing a function configuration of an image processing unit according to a modification example of the fourth embodiment.

It may also be possible to perform the above-described head shading processing for a threshold value matrix. FIG. 14 is a block diagram showing a detailed configuration of an image processing unit 106"_2 according to the present modification example. In the image processing unit 106"_2 in FIG. 14, the threshold value matrix acquisition unit 1001 is added and the output thereof is input to a head shading processing unit 1302'. Further, the output of the head shading processing unit 1302' is input to a halftone processing unit 304"_2. Then, the head shading processing unit 1302' refers to density unevenness correction information and performs processing to convert the threshold value on the matrix line corresponding to each nozzle within the threshold value matrix into a threshold value by which is it possible to obtain a pixel value in accordance with the density characteristic of each nozzle. By correcting the threshold value within the threshold value matrix as described above, it is also possible to obtain the same effect.

As above, by the present embodiment also, in a case where a line drawing area, such as a thin line, and a solid area exist in a mixed manner within an input image, it is possible to form an image whose reproducibility of a line drawing is good by suppressing the disappearance of a line drawing and the occurrence of streak and unevenness on an image, which may occur resulting from a non-ejectable nozzle.

Other Embodiments

In the first to fourth embodiments, explanation is given by taking a case as an example where the image forming unit 107 mounts a head comprising one nozzle that draws the same pixel line. However, it is also possible to apply the contents described in each embodiment similarly to an image forming unit mounting a multi-column head comprising a plurality of nozzles drawing the same pixel line. That is, it is possible to apply the contents similarly to a case where the pixel value exchange processing is performed by taking a nozzle in another nozzle column drawing a peripheral pixel line of a non-ejectable nozzle as an alternative nozzle, which is a candidate of pixel value exchange.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

According to the technique of the present disclosure, in a case where a line drawing, such as a thin line, is included within input image data, it is possible to compensate for the output of a non-ejectable nozzle while suppressing deterioration of reproducibility thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-214295, filed Nov. 27, 2019 which is hereby incorporated by reference wherein in its entirety.

What is claimed is:

1. An image processing apparatus that generates halftone image data based on multi-valued input image data, which is used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing apparatus comprising:
an exchange unit configured to, based on positional information for specifying an abnormal nozzle in which an ejection failure has occurred among the plurality of nozzles, exchange a pixel value of a pixel on a pixel line corresponding to the abnormal nozzle and a pixel value of a pixel on a pixel line corresponding to another nozzle that is located in close proximity to the abnormal nozzle and in which no ejection failure has occurred for the input image data; and
a halftone processing unit configured to generate the halftone image data by performing halftone processing for the input image data for which pixel value exchange has been performed,
wherein the exchange unit performs the exchange in a case where the pixel value of the pixel on the pixel line corresponding to the abnormal nozzle is larger than a predetermined tone value.

2. The image processing apparatus according to claim 1, wherein the exchange unit compares the pixel value of the pixel on the pixel line corresponding to the abnormal nozzle and the pixel value of the pixel on the pixel line corresponding to the other nozzle and performs the exchange in a case where the pixel value of the pixel on the pixel line corresponding to the abnormal nozzle is larger.

3. The image processing apparatus according to claim 2, wherein the exchange unit:
sets n nozzles as candidates of the other nozzle; and
more preferentially performs the comparison in each of the n nozzles whose distance to the abnormal nozzle is shorter.

4. The image processing apparatus according to claim 1, further comprising:
a complementation processing unit configured to perform density complementation processing to distribute at least part of densities that are assumed to be obtained by the pixel line corresponding to the abnormal nozzle to the pixel line corresponding to another nozzle that is located in close proximity to the abnormal nozzle and in which no ejection failure has occurred.

5. The image processing apparatus according to claim 4, wherein the complementation processing unit corrects, based on the positional information, pixel values of pixels on the pixel line corresponding to the abnormal nozzle and the pixel values of the pixels on the pixel line corresponding to the other nozzle of the input image data for which the pixel value exchange has been performed and the halftone processing unit generates the halftone image data by performing halftone processing for corrected input image data.

6. The image processing apparatus according to claim 4, wherein the complementation processing unit corrects, based on the positional information, threshold values on a matrix line corresponding to the abnormal nozzle and threshold values on a matrix line corresponding to the other nozzle among threshold values of a threshold value matrix used in dither processing as the halftone processing and the halftone processing unit generates the halftone image data by performing the dither processing by using a corrected threshold value matrix for the input image data for which the pixel value exchange has been performed.

7. The image processing apparatus according to claim 1, further comprising:
a head shading processing unit configured to perform predetermined correction processing for putting a printing density at a nozzle position of each of the plurality of nozzles close to a target density.

8. The image processing apparatus according to claim 7, wherein the head shading processing unit performs the predetermined correction processing by using correction information specifying a correction coefficient for putting the printing density at each nozzle position close to the target density.

9. The image processing apparatus according to claim 8, wherein the predetermined correction processing is processing to correct, based on the correction information, pixel values of pixels on the pixel line corresponding to the abnormal nozzle and the pixel values of the pixels on the pixel line corresponding to the other nozzle of the input image data for which the pixel value exchange has been performed.

10. The image processing apparatus according to claim 8, wherein the predetermined correction processing is processing to correct, based on the correction information, threshold values on a matrix line corresponding to the abnormal nozzle and threshold values on a matrix line corresponding to the other nozzle among threshold values of a threshold value matrix used in dither processing.

11. The image processing apparatus according to claim 1, further comprising:
  a control unit configured to control the image forming apparatus configured to form an image on the printing medium based on the halftone image data.

12. An image processing method of generating halftone image data based on multi-valued input image data, which is used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing method comprising:
  exchanging, based on positional information for specifying an abnormal nozzle in which an ejection failure has occurred among the plurality of nozzles, a pixel value of a pixel on a pixel line corresponding to the abnormal nozzle and a pixel value of a pixel on a pixel line corresponding to another nozzle that is located in close proximity to the abnormal nozzle and in which no ejection failure has occurred for the input image data; and
  generating the halftone image data by performing halftone processing for the input image data for which pixel value exchange has been performed,
  wherein the exchange is performed in a case where the pixel value of the pixel on the pixel line corresponding to the abnormal nozzle is larger than a predetermined tone value.

13. A non-transitory computer readable storage medium storing a program for causing a computer to perform an image processing method of generating halftone image data based on multi-valued input image data, which is used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing method comprising:
  exchanging, based on positional information for specifying an abnormal nozzle in which an ejection failure has occurred among the plurality of nozzles, a pixel value of a pixel on a pixel line corresponding to the abnormal nozzle and a pixel value of a pixel on a pixel line corresponding to another nozzle that is located in close proximity to the abnormal nozzle and in which no ejection failure has occurred for the input image data; and
  generating the halftone image data by performing halftone processing for the input image data for which pixel value exchange has been performed,
  wherein the exchange is performed in a case where the pixel value of the pixel on the pixel line corresponding to the abnormal nozzle is larger than a predetermined tone value.

\* \* \* \* \*